United States Patent
Okutsu et al.

[11] 3,872,083
[45] Mar. 18, 1975

[54] NUCLEOSIDE-5'-DIPHOSPHATE ETHANOLAMINES AND METHOD OF PRODUCING THE SAME

[75] Inventors: Masaru Okutsu; Akihiro Yamazaki, both of Kawasaki, Japan

[73] Assignee: Ajinomoto Co., Inc., Tokyo, Japan

[22] Filed: Feb. 22, 1973

[21] Appl. No.: 334,574

[30] Foreign Application Priority Data
Feb. 23, 1972 Japan................................ 47-18669

[52] U.S. Cl............................. 260/211.5 R, 424/180
[51] Int. Cl...................... C07d 51/52, C07d 51/54
[58] Field of Search............................. 260/211.5 R

[56] References Cited
UNITED STATES PATENTS
3,666,748   5/1972   Honjo et al. ................. 260/211.5 R

OTHER PUBLICATIONS
"Jour. Bio. Chem." Vol. 222 1956, P. 185.

*Primary Examiner*—Johnnie R. Brown
*Attorney, Agent, or Firm*—Hans Berman; Kurt Kelman

[57] ABSTRACT

Purine and pyrimidine-5'-monophosphates, AICAR, N-succinyl-AICAR, and their salts react with phosphoryl ethanolamines of the formula

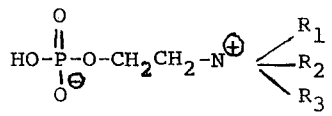

wherein $R_1$, $R_2$, $R_3$ are hydrogen or lower alkyl having up to four carbon atoms, and salts of such phosphoryl ethanolamines in the presence of S-triazine derivatives, particularly cyanuric chloride, as condensation agents to form nucleoside-5'-diphosphate ethanolamines of the formula

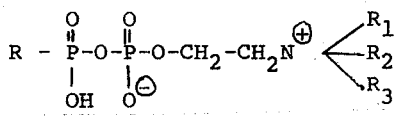

wherein R is the nucleoside moiety of the starting material, and $R_1$, $R_2$, $R_3$ are as above. Some of the compounds are known therapeutic agents, and those which are new have corresponding physiological properties.

14 Claims, No Drawings

NUCLEOSIDE-5'-DIPHOSPHATE ETHANOLAMINES AND METHOD OF PRODUCING THE SAME

This invention relates to a method of producing nucleoside-5'-diphosphate ethanolamines and to novel nucleoside-5'-diphosphate ethanolamines capable of being produced by the method.

It is known that nucleoside-5'-diphosphate ethanolamines are formed by condensation of the corresponding nucleoside-5'-monophosphates with phosphoryl ethanolamine in the presence of condensing agents such as dicyclohexylcarbodiimide (J.Bio.Chem. 222 [1956] 185), trichloroacetonitrile (Japanese Patent Publications Nos. 4505/1970, 37594/1971) or N,N'-thionyl-bis-2-alkylimidazole (Japanese Patent Publication No. 37546/1971). Cytidine-5'-diphosphate choline may be prepared by the known methods and is a known central nervous system stimulant.

The known methods are not well suited for industrial application because of the high cost of the necessary condensing agents, the inconvenience of handling the same, and the low yields of the desired products.

It has now been found that the known reaction can be performed conveniently, at relatively low cost, and with good yields if the condensing agent is an S-triazine derivative, more specifically cyanuric chloride or the 2-amino-4,6-dichloro-, 2-hydroxy-4,6-dichloro-, 2-ethoxy-4,6-dichloro-, 2,4-dipyridino-6-chloro-, and 2,4-diamino-6-chloro-S-triazines. In the absence of any advantages known to be available from the more complex and less readily available triazine derivatives, cyanuric chloride is preferred.

The condensing agents of the invention have been found to be effective in converting all tested nucleoside-5'-monophosphates to the corresponding diphosphate ethanolamines by reaction with phosphoryl ethanolamine and its homologs, the term "nucleoside" being employed in its broadest sense to define nitrogen glucosides of heterocyclic bases (Hackh's Chemical Dictionary).

The primary starting material thus may be a purine base or pyrimidine base nucleoside-5'-monophosphate which may or may not occur in nature, AICAR, or a derivative or AICAR having a substituent on the imidazole ring. Nucleosides whose 5'-phosphates have been used successfully in carrying out the method of the invention include adenosine, inosine, guanosine, $N^1$-methylinosine, 2-methylinosine, 2-methylthioinosine, 6-thioinosine, $N^2$-methylguanosine, $N^2$, $N^2$-dimethylguanosine, $N^6$-methyladenosine, $N^6$, $N^6$-dimethyladenosine, cytidine, uridine, deoxycytidine, deoxyuridine, 1-$\beta$-D-arabinofuranosyluracil, and the method has also been performed successfully with AICAR and N-succinyl-AICAR, AICAR being the common abbreviation for 5-amino-1-ribofuranosylimidazole-4-carboxamide-5'-phosphate.

The nucleoside-5'-monophosphate may be combined with the phosphorylethanolamine and the condensing agent in the free acid form or in the form of a salt which reacts as the free acid. Suitable salts include those of many metals, ammonium salts, and amine salts such as those with ethylamine, diethylamine, triethylamine, pyridine, piperidine, pyrrolidine, and morpholine, and the cationic moiety has not been found to have a significant or unexpected effect.

The phosphorylethanolamine compounds employed are of the formula

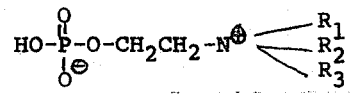

(I)

wherein $R_1$, $R_2$, $R_3$ may be hydrogen or alkyl having up to four carbon atoms to produce the corresponding compound of the formula

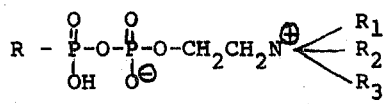

(II)

wherein R is the nucleoside-5'-radical, and $R_1$, $R_2$, $R_3$ are as defined above.

Phosphorylethanolamines that react readily with the nucleoside-5'-phosphates in the presence of the condensing agents of the invention include phosphorylcholine, O-phosphodimethylethanolamine, O-phosphomonomethylethanolamine, O-phosphoethanolamine, and their high homologs. The phosphorylethanolamines may be added to the condensation mixture in the free acid form or in the form of salts which act as the corresponding acids under the reaction conditions. Suitable salts include the halides and the metal halide salts.

The reaction is preferably carried out in the presence of an inert organic solvent, but the solvent is not always necessary. Formamide, dimethylformamide, o-chlorophenol, acetonitrile, triethyl phosphate, and pyridine are representative of the many types of solvents that may safely be employed and are preferred. The condensation reaction takes place at room temperature of about 20°C although the temperature is not critical. In the absence of advantages available by heating or cooling, it is usually most convenient to combine the ingredients of the condensation mixture at ambient temperature and to wait until the reaction has run its course, agitation being employed in a conventional manner if the reaction mixture is not homogeneous.

The nucleoside-5'-phosphate is utilized to best advantage if the normally less expensive phosphorylethanolamine is present in the condensation mixture in an excess whose magnitude is not critical. The condensing agent is preferably employed in excess, the amount of condensing agent being 1.5 mole to 5 moles per mole of nucleoside-5'-monophosphate. Nothing useful is achieved by a greater amount of condensing agent although it does not interfere with the reaction.

The crude product is readily recovered from the condensation mixture and may be purified in a conventional manner. Selective solvent extraction followed by evaporation of the solvent and/or purification by means of ion exchange resins may be resorted to. The purified product may be identified by elementary analysis, paper electrophoresis, phosphorus determination by means of Hanes' reagent (Nature 164 [1949] 1107), periodate oxidation, comparison of the $^{31}$P-NMR spectra of the starting material of Formula (I) with the product of Formula (II), and the like.

The following Examples are further illustrative of this invention.

EXAMPLE 1

0.348 g Inosine-5'-monophosphate and 0.46 g phosphorylcholine were dissolved in 8 ml dimethylformamide. 2Ml pyridine and 0.4 g (2.2 milli moles) cyanuric chloride were added, and the mixture was stirred at room temperature for 12 hours. It was then filtered, and 200 ml acetone was added to the filtrate. The precipitate formed thereby was recovered and dissolved in 50 ml water, and the aqueous solution was passed through a 60 ml column of Dowex 1 × 2 formate. After the column was washed clear with water, the material absorbed on the ion exchange resin was eluted with 0.5 M formic acid, and the first fraction of the eluate was evaporated to dryness in a vacuum at about 40°C, and the residue was taken up in dilute sodium hydroxide solution. 20 Ml ethyl alcohol was added to the resulting solution to precipitate 0.24 g sodium salt of inosine-5'-diphosphate choline (45 percent yield). It was identified by elementary analysis, and its physical properties are listed below.

| Calculated for | $C_{15}H_{24}N_5O_{11}P_2Na \cdot 2H_2O$ | | |
|---|---|---|---|
| | 31.5% C | 4.94% H | 12.3% N | 10.8% P |
| Found: | 31.4% C | 4.92% H | 12.3% N | 10.8% P |
| Melting point: | 240°C | (decomposed) | | |
| UV absorption spectrum: | | | | |
| | $max^{pH1}$ | 251 m$\mu$ | | |
| | $max^{pH7}$ | 249 m$\mu$ | | |
| | $max^{pH13}$ | 253.5 m$\mu$ | | |

EXAMPLE 2

4.24 g Cytidine-5'-monophosphate triethylamine salt was dissolved in 40 ml formamide, and 6.6 g phosphoryl choline chloride was added. 6.4 g Cyanuric chloride was dissolved in 15 ml dimethylformamide, and the solution of the condensing agent was added dropwise to the solution of the reactants over a period of 3 hours. The resulting mixture was stirred at room temperature for 16 hours more, whereupon it was filtered, and the filtrate was poured into 400 ml acetone to precipitate the reaction product which was recovered and dissolved in 80 ml water. The aqueous solution was passed through a 300 ml column of Dowex 1 × 2 formate. After the column was washed with water, the material absorbed on the resin was eluted with 0.005 M formic acid. The eluate was evaporated to dryness in a vacuum to obtain 2.5 g cytidine-5'-diphosphate choline (51.5 percent yield). The infrared spectrum and the melting point of the crystalline material were identical with corresponding properties of a known sample.

EXAMPLE 3

0.43 g (1 milli mole) AICA riboside-5'-monophosphate morpholine salt and 0.36 g (2 milli moles) phosphorylcholine were dissolved in 10 ml formamide, and 0.4 g (2.2 milli moles) cyanuric chloride was gradually added to the solution which was then stirred at room temperature for 14 hours. It was worked up as in Example 2, and an aqueous solution of the reaction product was passed through a 50 ml column of Dowex 1 × 4 formate. After the column was washed with water, the material absorbed on the resin was eluted with 0.05 M formic acid. The eluate fraction which contained AICA riboside-5'-diphosphate choline was evaporated in a vacuum at 30° to 40°C, the residue was dissolved in a small amount of water, the solution was neutralized with dilute sodium hydroxide solution, and ethanol was added to precipitate 0.2 g sodium salt of AICA-riboside-5'-diphosphate choline (41.8 percent yield). It was identified by elementary analysis and had the physical properties listed below.

| Calculated for | $C_{14}H_{26}N_5O_{11}P_2Na$ | | |
|---|---|---|---|
| | 31.98% C | 4.99% H | 13.33% N |
| Found: | 32.31% C | 5.30% H | 13.12% N |
| UV absorption spectrum: | | | |
| | $max^{pH1}$ | 269 and 248 m$\mu$ | |
| | $max^{pH13}$ | 269 m$\mu$ | |

EXAMPLE 4

3.62 g $N^1$-Methylinosine-5'-monophosphate was dissolved in 70 ml dimethylformamide, and 3.8 g phosphorylcholine was added to the solution. 7.4 g Cyanuric chloride was added thereafter at 5° to 10°C, and the resulting mixture was stirred at room temperature for 12 hours and filtered. The filtrate was poured into 600 ml acetone to precipitate the reaction product which was washed with 100 ml ethanol, dissolved in 200 ml water, and neutralized with dilute sodium hydroxide. The solution was passed through a 300 ml column of Dowex 1 × 2 formate. After the column was washed with water, the material absorbed on the resin was eluted with 0.03 M formic acid. The eluate was evaporated to dryness in a vacuum at 30° to 40°C, and the residue was washed with ethanol to obtain 2.3 g of a white powder of $N^1$-methylinosine-5'-diphosphate choline monohydrate (43 percent yield). It was identified by elementary analysis and had the physical properties listed below.

| Calculated for | $C_{16}H_{27}N_5O_{11}P_2 \cdot H_2O$ | | | |
|---|---|---|---|---|
| | 35.23% C | 5.32% H | 12.84% N | 11.10% P |
| Found: | 35.48% C | 5.63% H | 12.95% N | 11.38% P |
| UV absorption spectrum: | | | | |
| | $max^{pH1}$ | 252 m$\mu$ | | |
| | $max^{pH7}$ | 251 m$\mu$ | | |
| | $max^{pH13}$ | 251.5 m$\mu$ | | |

During paper electrophoresis in 0.5 percent triethylamine carbonate buffer, the observed movement value was half that of the starting $N^1$-methylinosine-5'-monophosphate.

EXAMPLE 5

1.8 g 2-Methylinosine-5'-monophosphate and 1.5 g phosphoryl choline were dissolved in 40 ml dimethylformamide, and 3.5 g cyanuric chloride was added to the solution in the course of 6 hours at 5° to 10°C. The resulting solution was stirred at room temperature for 14 hours. The reaction mixture was worked up as in Example 4 to obtain 1.65 g of powdery 2-methylinosine-5'-diphosphate choline dihydrate (57 percent yield). It was identified by elementary analysis and had the physical properties listed below.

| Calculated for | $C_{16}H_{27}N_5O_{11}P_2 \cdot 2H_2O$ | | | |
|---|---|---|---|---|
| | 34.10% C | 5.51% H | 12.43% N | 11.01% P |
| Found: | 34.02% C | 5.82% H | 12.15% N | 10.76% P |

-Continued

UV absorption spectrum:
MAX$^{pH1}$ 250 mμ
max$^{pH7}$ 253 mμ
max$^{pH13}$ 257 mμ

During paper electrophoresis in 0.5 percent triethylamine carbonate buffer the observed movement value was half that of the starting 2-methylinosine-5'-monophosphate.

EXAMPLE 6

0.36 g 6-Thioinosine-5'-monophosphate was dissolved in 15 ml formamide, and 0.7 g phosphoryl choline was then added. 0.55 g Cyanuric chloride was dissolved in 5 ml dimethylformamide, and the solution of the condensing agent was added dropwise to the solution of the reactants over a period of 3 hours at 0° to 5°C, and the resulting solution was stirred at room temperature for 8 hours. The reaction mixture was filtered with suction, and the filtrate was poured into 150 ml acetone to precipitate the crude product which was filtered off, washed with a small amount of ethanol, and dissolved in 50 ml water. The aqueous solution was neutralized with dilute sodium hydroxide and passed through a 50 ml column of Dowex 1 × 4 formate (50 to 100 mesh). After the column was washed with water and then with 0.01 M formic acid, the material absorbed on the resin was eluted with 0.07 M formic acid. The eluate was evaporated to dryness in a vacuum at 20° to 25°C. The residue was washed with as little ethanol as possible, and 0.21 g of a light yellow powder of 6-thioinosine-5'-diphosphate choline dihydrate (36.2 percent yield) was recovered by filtering the ethanol suspension. It was identified by elementary analysis and had the physical properties listed below:

Calculated for $C_{15}H_{25}N_5O_{10}SP_2.2H_2H$
31.86% C  5.13% H  12.39% N  10.97% P
Found: 31.58% C  5.40% H  12.41% N  11.26% P
UV absorption spectrum:
max$^{pH1}$ 324 mμ
max$^{pH13}$ 311 mμ

During paper electrophoresis in 0.5 percent triethylamine carbonate buffer the observed movement value was half that of the starting 6-thioinosine-5'-monophosphate. NMR spectrum: 3.3 ppm N(CH$_3$)$_3$

EXAMPLE 7

0.58 g 2-Methylthioninosine-5'-monophosphate tri-n-butylamine salt and 0.38 g phosphoryl choline was dissolved in 20 ml formamide, and 0.55 g cyanuric chloride was added to the solution little by little at 5° to 10°C. The solution was stirred for 10 hours at about 30°C, and the reaction mixture was worked up as in Example 4 to obtain 0.31 g 2-methylthioinosine-5'-diphosphate choline dihydrate (55.6 percent yield). It was identified by elementary analysis and had the physical properties listed below.

Calculated for $C_{16}H_{27}N_5O_{11}SP_2.2H_2O$
32.27% C  5.21% H  11.76% N  10.42% P
Found: 32.46% C  5.63% H  11.68% N  10.21% P
UV absorption spectrum:
max$^{pH1}$ 270 mμ
max$^{pH7}$ 260 and 278 (shoulder) mμ
max$^{pH13}$ 272 mμ

During paper electrophoresis in 0.5 percent triethylamine carbonate buffer the observed movement value was half that of the starting 2-methylthioinosine-5'-monophosphate.

Calculated for $C_{16}H_{27}N_6O_{11}P_2Na.H_2O.C_2H_5OH$
34.29% C  5.56% H  13.33% N  10.16% P
Found: 34.32% C  5.31% H  13.47% N  10.02% P
UV absorption spectrum
max$^{pH1}$ 258 and 280 (shoulder) mμ
max$^{pH7}$ 253 and 280 (shoulder) mμ
max$^{pH13}$ 258 and 270 (shoulder) mμ

EXAMPLE 8

5.6 g $N^2$-Methylguanosine-5'-monophosphate tri-n-butylamine salt was dissolved in 80 ml formamide, and 3.8 g phosphoryl choline was added to the solution. After 4.4 g cyanuric chloride was added to the solution little by little at 0° to 5°C, the resulting solution was stirred at room temperature for 12 hours.

3 g Cyanuric chloride was again added, and the solution was stirred for 8 hours. The reaction mixture was filtered, and the filtrate was poured into 800 ml acetone. After 18 hours, a precipitate was filtered off, washed with a small amount of ethanol, and dissolved in 250 ml water. The aqueous solution was neutralized with dilute sodium hydroxide, and passed through a 400 ml column of Dowex 1 × 2 (Cl type). After the column was washed with water, the material absorbed on the resin was eluted with 0.005 N hydrochloric acid. About 6 liters of the eluate were passed through a column packed with 150 ml active charcoal. The charcoal column was washed with water until neutral and eluted with a mixture of equal volumes of 5 percent ammonia and methanol. The eluate was evaporated to dryness in a vacuum, the residue was dissolved in 30 ml water, and the solution was ajdusted to pH 3.0 by adding Amberlite IR-120 (H type). The ion-exchange resin was filtered off, and the filtrate was neutralized with dilute sodium hydroxide solution and evaporated in a vacuum. 100 Ml ethanol was added to the residual paste to obtain a filterable precipitate which weighed 3.8 g (60.5 percent yield).

It was identified as $N^2$-methylguanosine-5'-diphosphate choline by elementary analysis and had the physical properties listed below.

During paper electrophoresis in 0.5 percent triethylamine carbonate buffer the observed movement value was half that of the starting $N^2$-methylguanosine-5'-monophosphate.

Substantially the same results were achieved when cyanuric chloride was replaced by equimolecular amounts of 2-amino-4,6-dichloro-S-triazine, 2-hydroxy-4,6-dichloro-S-triazine, 2-ethoxy-4,6-dichloro-S-triazine, 2,4-dipyridino-6-chloro-S-triazine, or 2,4-diamino-6-chloro-S-triazine.

The compounds prepared by the methods of Examples 1 and 3 to 8 which have the formula

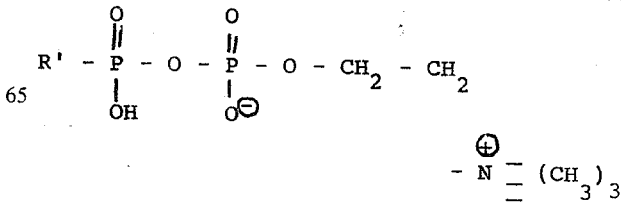

wherein R' is the 5'-riboside radical of inosine, 5-amino-1-ribofuranosylimidazole-4-carboxamide, N¹-methylinosine, 2-methylinosine, 6-thioinosine, 2-methylthioinosine, or N²-methylguanosine, are new and have the same physiological properties as the known cytidine-5'-diphosphate choline prepared in Example 2, but are more effective in some instances.

Cytidine-5'-diphosphate choline was successfully administered, for example, in cases of brain damage as lecithin precursor and led to remarkable improvements of the clinical symptoms. By means of treatment with this substance, the survival rate in the case of brain damage cauld be considerably increased.

The compounds prepared in Examples 1 and 3 to 8 are physiologically interesting and are of use not only as pharmaceuticals but also in research. Many of the compounds play a very large part in the physiological cellular processes, for example in the biosynthesis of phosphatides and of cell wall structures.

While the invention has been described with particular reference to specific embodiments, it is to be understood that is is not limited thereto, but is to be construed broadly and restricted solely by the scope of the appended claims.

What is claimed is:

1. A method of producing a nucleoside-5'-diphosphate ethanolamine of the formula

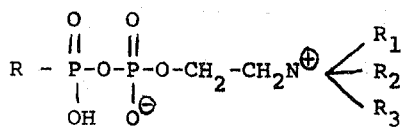

which comprises:

a. reacting a nucleoside-5'-monophosphate of the formula R—PO₂H₂ with a phosphorylamine compound of the formula

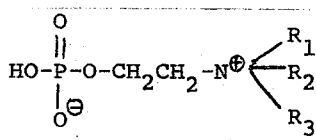

in the presence of a condensing agent until said nucleoside-5'-diphosphate ethanolamine is formed; and b. recovering the formed nucleoside-5'-diphosphate ethanolamine from the reaction mixture, 1. in said formulas R being the 5'-nucleoside moiety of said nucleoside-5'-monophosphate, and R₁, R₂, and R₃ being hydrogen or alkyl having up to four carbon atoms, 2. said condensing agent being an S-triazine derivative selected from the group consisting of cyanuric chloride, 2-amino-4,6-dichloro-S-triazine, 2-hydroxy-4,6-dichloro-S-triazine, 2-ethoxy-4,6-dichloro-S-triazine, 2,4-dipyridino-6-chloro-S-triazine, and 2,4-diamino-6-chloro-S-triazine.

2. A method as set forth in claim 1, wherein said condensing agent is cyanuric chloride.

3. A method as set forth in claim 1, wherein R is the 5'-nucleoside radical of adenosine, inosine, guanosine, N¹-methylinosine, 2-methylinosine, 2-methylthioinosine, 6-thioinosine, N²-methylguanosine, N², N²-dimethylguanosine, N⁶-methyladenosine, N⁶, N⁶-dimethyl-adenosine, cytidine, uridine, deoxycytidine, deoxyuridine, 1-β-D-arabinofuranosyluracil, 5-amino-1-ribofuranosylimidazole-4-carboxamide, or N-succinyl-5-amino-1-ribofuranosylimidazole-4-carboxamide.

4. A method as set forth in claim 1, wherein said phosphorylamine compound is phosphorylcholine, O-phosphodimethylethanolamine, O-phosphomonomethylethanolamine, or O-phosphoethanolamine.

5. A method as set forth in claim 1, wherein said nucleoside-5'-monophosphate and said phosphorylamine compound are reacted in a solvent medium selected from the group consisting of formamide, dimethylformamide, o-chlorophenol, acetonitrile, triethyl phosphate, and pyridine.

6. A method as set forth in claim 1, wherein said condensing agent is cyanuric chloride and present during said reacting in an amount of 1.5 mole to 5 moles per mole of said nucleoside-5'-monophosphate.

7. A compound of the formula

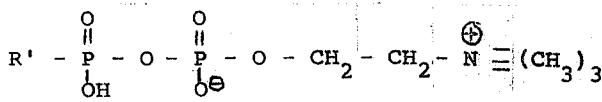

wherein R' is the 5'-riboside radical or inosine, 5-amino-1-ribofuranosylimidazole-4-carboxamide, N¹-methylinosine, 2-methylinosine, 6-thioinosine, 2-methylthioinosine, or N²-methylguanosine.

8. A compound as set forth in claim 7 which is inosine-5'-diphosphate choline.

9. A compound as set forth in claim 7 which is ALCA-riboside-5'-diphosphate choline.

10. A compound as set forth in claim 7 which is N¹-methylinosine-5'-diphosphate choline.

11. A compound as set forth in claim 7 which is 2-methylinosine-5'-diphosphate choline.

12. A compound as set forth in claim 7 which is 6-thioinosine-5'-diphosphate choline.

13. A compound as set forth in claim 7 which is 2-methylthioinosine-5'-diphosphate choline.

14. A compound as set forth in claim 7 which is N²-methylguanosine-5'-diphosphate choline.

* * * * *